(12) United States Patent
    Tachibana et al.

(10) Patent No.: US 10,206,214 B2
(45) Date of Patent: Feb. 12, 2019

(54) METHOD AND APPARATUS FOR AZIMUTH DETECTION

(71) Applicant: Sony Mobile Communications Inc., Tokyo (JP)

(72) Inventors: Makoto Tachibana, Tokyo (JP); Tetsuya Naruse, Kanagawa (JP); Takashi Shiina, Kanagawa (JP); Tatsunobu Ando, Kanagawa (JP)

(73) Assignee: SONY MOBILE COMMUNICATIONS INC., Tokyo (JP)

(*) Notice: Subject to any disclaimer, the term of this patent is extended or adjusted under 35 U.S.C. 154(b) by 221 days.

(21) Appl. No.: 14/992,090

(22) Filed: Jan. 11, 2016

(65) Prior Publication Data

US 2017/0034811 A1    Feb. 2, 2017

Related U.S. Application Data

(60) Provisional application No. 62/199,772, filed on Jul. 31, 2015.

(51) Int. Cl.
| | |
|---|---|
| *H04W 72/04* | (2009.01) |
| *H04W 4/02* | (2018.01) |
| *H04W 16/28* | (2009.01) |
| *H04W 4/80* | (2018.01) |

(52) U.S. Cl.
CPC ......... *H04W 72/046* (2013.01); *H04W 4/026* (2013.01); *H04W 4/80* (2018.02); *H04W 16/28* (2013.01)

(58) Field of Classification Search
CPC ... H04W 72/046; H04W 4/008; H04W 4/026; H04W 4/80; H04W 16/28; G01S 19/23; G01S 19/235; G01S 2007/403; G01S 5/0252; G01S 5/0045; H01R 24/66; H01R 24/68; H01R 39/64; H01R 39/643
See application file for complete search history.

(56) References Cited

U.S. PATENT DOCUMENTS

| | | | | |
|---|---|---|---|---|
| 3,812,712 | A * | 5/1974 | Hoffman | G01P 13/02 340/672 |
| 5,214,364 | A * | 5/1993 | Perdue | G05B 19/408 318/600 |
| 7,286,844 | B1 * | 10/2007 | Redi | H04W 52/46 455/13.4 |
| 9,175,963 | B2 * | 11/2015 | Kelly | G01C 21/12 |
| 9,357,367 | B2 * | 5/2016 | Ranki | G01S 5/0027 |

(Continued)

FOREIGN PATENT DOCUMENTS

JP    2013-210866    10/2013

*Primary Examiner* — Asad M Nawaz
*Assistant Examiner* — Thomas R Cairns
(74) *Attorney, Agent, or Firm* — Xsensus LLP

(57) ABSTRACT

Aspects of the disclosure provide a radio transmitting device that includes a memory, a controller and a wireless communication processing circuit. The memory is configured to store correction data for correcting an azimuth angle detected by a device in a surrounding range around a location where the radio transmitting device is installed. The controller is configured to read the correction data from the memory. The wireless communication processing circuit is configured to transmit a radio signal to carry the correction data to assist the device in the surrounding range to correct the azimuth angle.

20 Claims, 11 Drawing Sheets

(56) References Cited

U.S. PATENT DOCUMENTS

2009/0227122 A1\* 9/2009 Jubelirer .............. H01R 31/065
439/11
2015/0036042 A1\* 2/2015 Umehara ............... G03B 15/05
348/371

\* cited by examiner

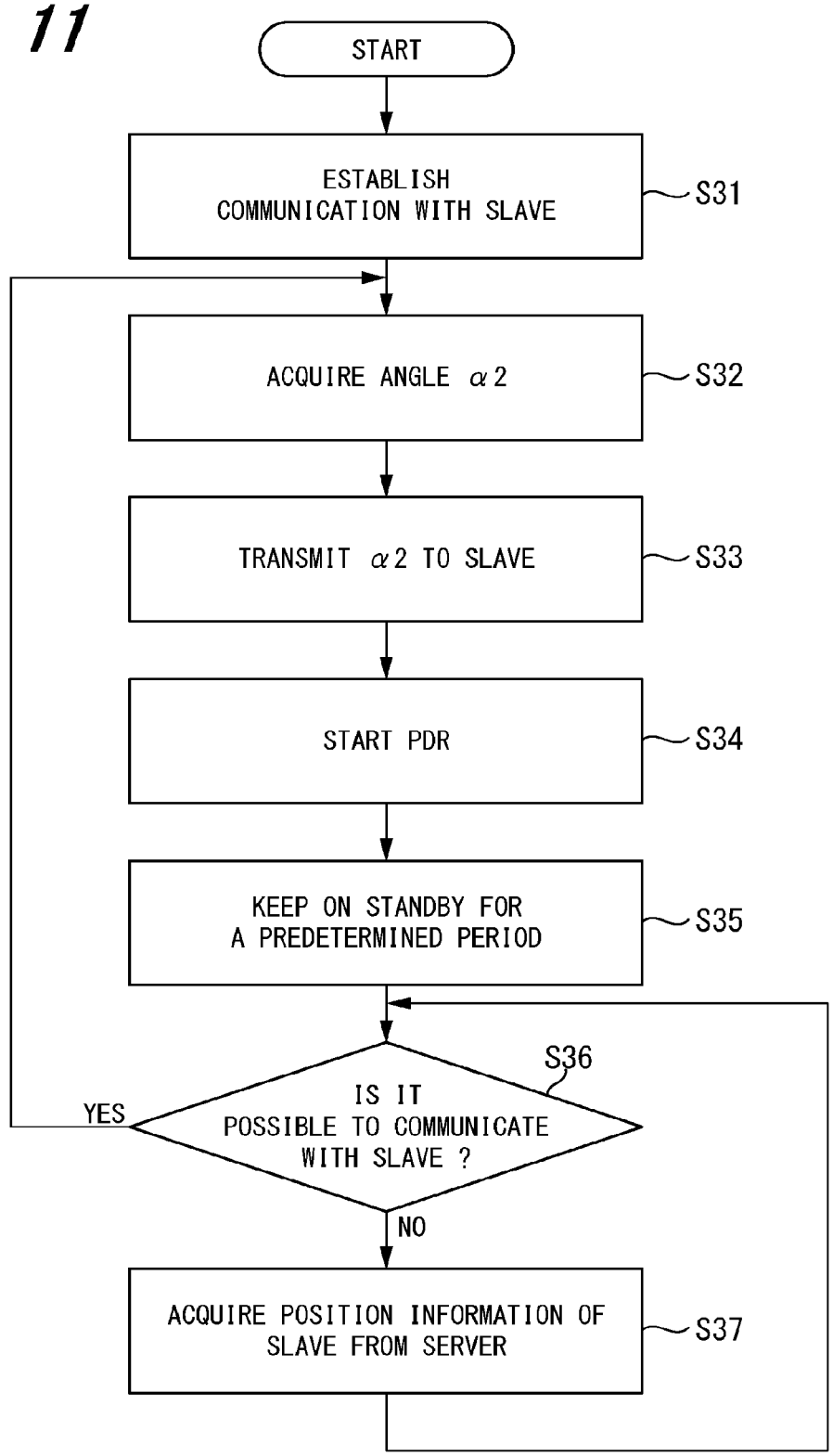

METHOD AND APPARATUS FOR AZIMUTH DETECTION

INCORPORATION BY REFERENCE

This present disclosure claims the benefit of U.S. Provisional Application No. 62/199,772, "METHOD AND APPARATUS FOR AZIMUTH DETECTION" filed on Jul. 31, 2015, which is incorporated herein by reference in its entirety.

TECHNICAL FIELD

This disclosure is related to a wireless transmitter which transmits a beacon signal to mobile devices, such as a smart phone, and the like to assist azimuth detection.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A mobile device, such as a smart phone, a tablet computer and the like, can include a positioning system, such as Global Positioning System (GPS), to measure a position of the mobile device. In an example, the GPS receives the electromagnetic wave from one or more satellites, and measures present position based on the electromagnetic wave. Generally, the GPS based positioning is used outdoors where the GPS can receive the electromagnetic wave from the satellites. Indoors, in an example, a mobile device uses an autonomous navigation system to detect present position. For example, the autonomous navigation system includes a geomagnetic sensor and an acceleration sensor. The geomagnetic sensor detects an azimuth and the acceleration sensor detects a movement distance. The mobile device can calculate present position using the information of the azimuth and the movement distance.

SUMMARY

Aspects of the disclosure provide a radio transmitting device that includes a memory, a controller and a wireless communication processing circuit. The memory is configured to store correction data for correcting an azimuth angle detected by a device in a surrounding range around a location where the radio transmitting device is installed. The controller is configured to read the correction data from the memory. The wireless communication processing circuit is configured to transmit a radio signal to carry the correction data to assist the device in the surrounding range to correct the azimuth angle.

In an embodiment, the wireless communication processing circuit is configured to transmit the radio signal as a beacon signal that is transmitted periodically to carry the correction data.

According to an aspect of the disclosure, the radio transmitting device includes a geomagnetic sensor configured to measure an azimuth angle at the location. Further, the radio transmitting device includes a reference angle device, such as a potentiometer, and the like configured to generate an electrical signal in response to a reference angle. The controller is configured to calculate the correction data based on the reference angle and the azimuth angle detected by the geomagnetic sensor.

Further, according to an aspect of the disclosure, the radio transmitting device includes a plug for connection to an AC power source and a rotary mechanism configured to adjust a relative angle between the plug and the potentiometer.

Aspects of the disclosure also provide a mobile device that includes a geomagnetic sensor, a wireless communication processing circuit and a controller. The geomagnetic sensor is configured to detect an azimuth angle. The wireless communication processing circuit is configured to receive a radio signal carrying correction data for correcting the azimuth angle. The controller is configured to correct the azimuth angle detected by the geomagnetic sensor based on the correction data carried in the radio signal.

Aspects of the disclosure also provide a method for detecting azimuth angle. The method includes receiving, by a wireless communication processing circuit in a mobile device, a radio signal carrying correction data for azimuth angle correction, detecting, by a geomagnetic sensor, an azimuth angle, and correcting the azimuth angle based on the correction data carried in the radio signal.

BRIEF DESCRIPTION OF THE DRAWINGS

Various embodiments of this disclosure that are proposed as examples will be described in detail with reference to the following figures, wherein like numerals reference like elements, and wherein:

FIG. 11 shows a flowchart outlining a process example executed by the controller 110 of the master mobile device 100a.

DETAILED DESCRIPTION OF EMBODIMENTS

Figure 1:
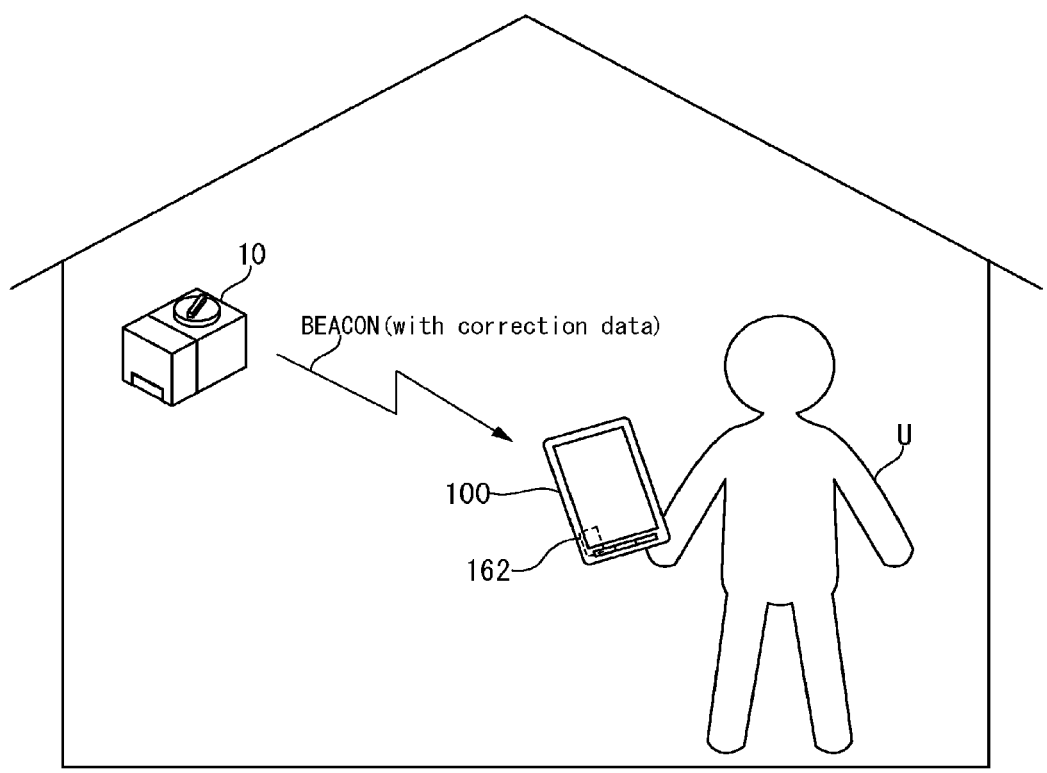
FIG. 1 shows a diagram for azimuth detection according to an embodiment of the disclosure.

FIG. 1 shows a diagram for azimuth detection according to an embodiment of the disclosure. In the FIG. 1 example, a mobile device 100 receives a radio signal from a radio transmitting device 10. The radio signal carries azimuth correction information to assist the mobile device 100 to perform azimuth detection.

The mobile device 100 can be any suitable device, such as a smart phone, a tablet computer, a laptop computer, a wearable electronic device, a cellular phone, a music player, a camera, and the like. In an example, the mobile device 100 is owned by a user U, and the user U moves around with the mobile device 100.

In an embodiment, the radio transmitting device 10 is installed inside a building. In an example, the radio transmitting device 10 transmits the radio signal repeatedly, for example, at regular intervals. The radio signal is referred to as a beacon signal in some example. The radio signal can be transmitted according to any suitable wireless technology and/or standard. In an example, the radio signal is transmitted according to a short-distance wireless communication standard, such as Bluetooth Low Energy (BLE), and the like.

The radio signal transmitted by the radio transmitting device 10 carries various information. In an example, the radio signal carries an identification code which uniquely identifies the radio transmitting device 10 from other radio transmitting devices. Further, the radio signal carries azimuth correction information. In an example, the azimuth correction information is indicative of an error between an azimuth detected by a geomagnetic sensor and a true azimuth.

In the FIG. 1 example, the mobile device 100 includes a geomagnetic sensor 162 configured to detect the azimuth. When the mobile device 100 is at a location able to receive the radio signal, the mobile device 100 corrects the detected azimuth based on the azimuth correction information in the radio signal. Based on the corrected azimuth and other suitable information, the mobile device 100 detects the present position, for example using an autonomous navigation system. In the autonomous navigation system, the determined position is a relative position from a reference position.

According to an aspect of the disclosure, the azimuth detected by a geomagnetic sensor varies in different surrounding environment. In an example, in a building, the azimuth detected by a geomagnetic sensor varies from several degrees to several dozen degrees from a true azimuth due to the influences of building materials, such as the steel frame and the like. In another example, the azimuth detected by a geomagnetic sensor outdoors may change due to the influence of the surrounding buildings, and the like. When the azimuth angle detected by the geomagnetic sensor 162 has errors due to the effect the buildings and/or the like, the determined position by the mobile device 100 using the autonomous navigation has errors. When errors in the azimuth detection are corrected, the autonomous navigation system can provide more accurate position detection.

Figure 2:
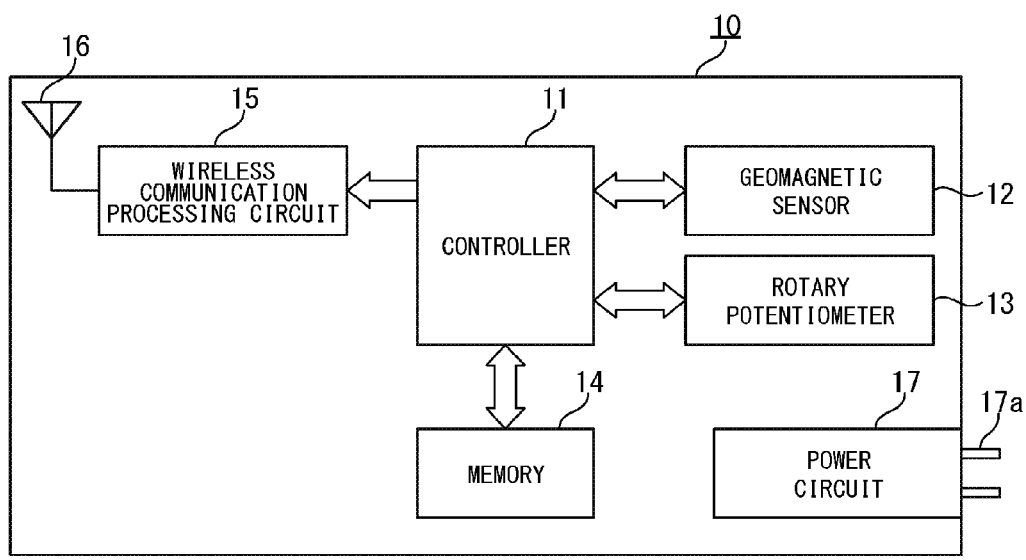
FIG. 2 shows an example of the radio transmitting device 10 according to an embodiment of the disclosure.

FIG. 2 shows an example of the radio transmitting device 10 according to an embodiment of the disclosure. The radio transmitting device 10 includes a controller 11, a geomagnetic sensor 12, a rotary potentiometer 13, a memory 14, a wireless communication processing circuit 15, an antenna 16, and a power supply circuit 17 coupled together as shown in FIG. 2.

The geomagnetic sensor 12 detects a direction of a terrestrial magnetism, and then detects an azimuth. In an example, the geomagnetic sensor 12 generates a first voltage indicative of the detected azimuth.

Figure 3A:
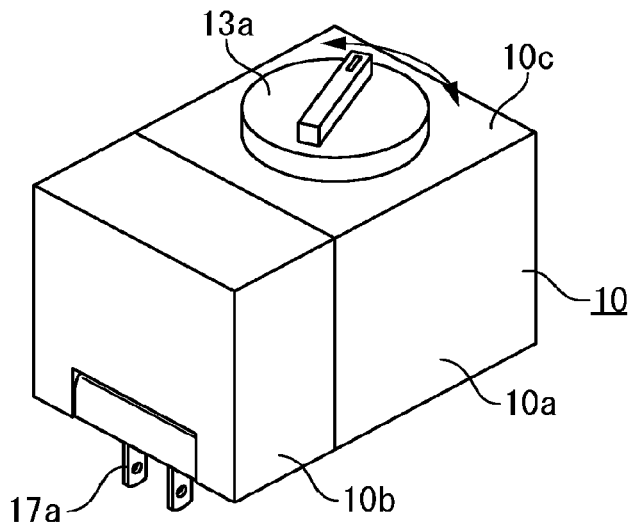
FIG. 3A, FIG. 3B, and FIG. 3C are figures showing an example of a case structure of the radio transmitting device 10 according to an embodiment of the disclosure.

The rotary potentiometer 13 is a variable resistor. In an example, the resistance value of the rotary potentiometer 13 can be changed by rotating a knob. FIG. 3A shows an example of the radio transmitting device 10 with a knob 13a attached to the surface of the radio transmitting device 10. The knob 13a can be turned to adjust the resistance of the rotary potentiometer 13 in the radio transmitting device 10.

In an example, the rotary potentiometer 13 generates a second voltage based on the rotation position of the knob 13a. For example, amplitude of the second voltage is proportional to the rotation angle of the knob 13a. The second voltage is provided to the controller 11 to indicate the rotation angle of the knob 13a.

According to an aspect of the disclosure, at a time when an operator installs the radio transmitting device 10, the operator can adjust the knob 13a of the rotary potentiometer 13 to indicate a specific azimuth. In an example, the specific azimuth is a true azimuth at the position of the installation. The specific azimuth can be measured by a different device using a different technology.

The controller 11 receives the first voltage from the geomagnetic sensor 12 and the second voltage from the rotary potentiometer 13, and calculates a difference between the first voltage and the second voltage. In an example, based on the difference, the controller 11 determines the correction data. In an example, the correction data is indicative of an angle difference of the detected azimuth by geomagnetic sensor 12, and the specific azimuth set by the rotary potentiometer 13.

It is noted that the output of the geomagnetic sensor 12 is not limited to voltage, and can have any suitable form to indicate the detected magnetic direction. In an example, the geomagnetic sensor 12 outputs a digital value that indicates the magnetic direction. Further, the rotary potentiometer 13 can output another digital value indicative of the specific azimuth. Then, the controller 11 can receive the two digital values from the geomagnetic sensor 12 and the rotary potentiometer 13, calculate a difference and determine the correction data based on the difference.

In an example, the controller 11 is implemented by circuits. In another example, the controller 11 is implemented as a processing circuitry executing software instructions.

In an example, the controller 11 provides the correction data to the wireless communication processing circuit 15. The wireless communication processing circuit 15 generates the beacon signal to carry the correction data.

In addition, the memory 14 stores the identification code allocated to the radio transmitting device 10. The controller 11 reads the memory 14 to obtain the identification code, and provides the identification code to the wireless communication processing circuit 15. The wireless communication processing circuit 15 generates the beacon signal to carry the identification code. In an embodiment, the wireless communication processing circuit 15 is a short-distance wireless communication processing circuit, such as a BLE processing circuit.

The antenna 16 is coupled to the wireless communication processing circuit 15 to radio-transmit the beacon signal with a fixed period (for example, period of about one to several seconds).

In an example, the wireless communication processing circuit 15 uses a carrier frequency of about 2.4 GHz, and transmits a beacon signal according to a BLE wireless communication technology. In an example, the beacon signal can travel a distance about several meters. When the mobile device 100 is within the distance, the radio transmitting device 10 can communicate with the mobile device 100 based on the beacon signal.

According to an aspect of the disclosure, the radio transmitting device 10 includes the power supply circuit 17 having the plug 17a. In an example, the plug 17a can be plugged with an outlet socket to receive an AC power supply. In an example, the power supply circuit 17 converts the AC power into DC power, and provides the DC power to other circuit components, such as the wireless communication processing circuit 15, the controller 11, the memory 14, the geomagnetic sensor 12, the rotary potentiometer 13, and the like in the radio transmitting device 10.

In another embodiment, the power supply circuit 17 includes a battery pack to provide DC power to other circuit components in the radio transmitting device 10.

Figure 3B:
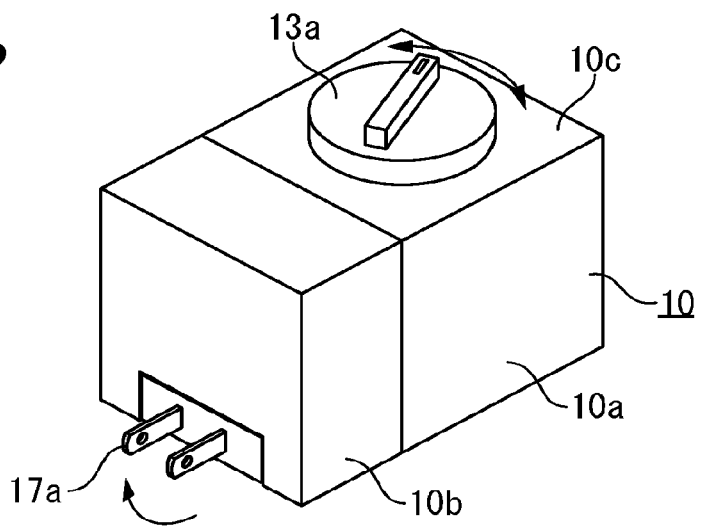
Figure 3C:
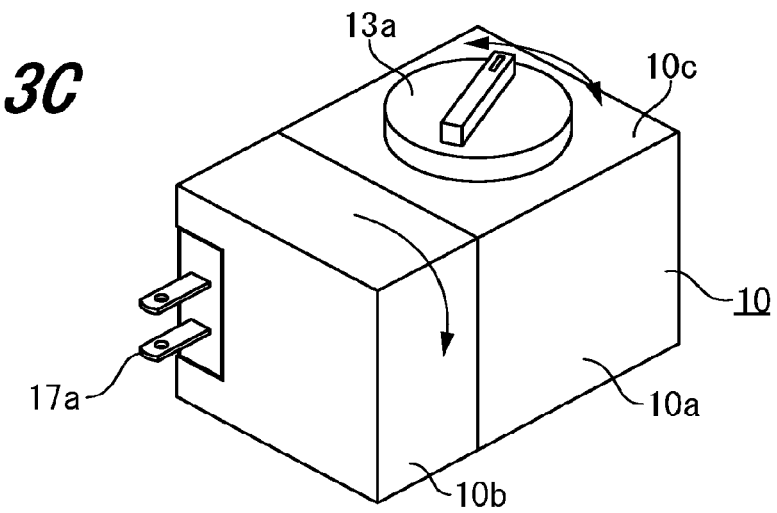

FIG. 3A, FIG. 3B, and FIG. 3C are figures showing an example of a case structure of the radio transmitting device 10 according to an embodiment of the disclosure.

In the FIGS. 3A-3C example, the radio transmitting device 10 includes a first case portion 10a and a second case portion 10b. In the example, the first case portion 10a and the second case portion 10b are connected in a rotatable manner.

In the example, the geomagnetic sensor 12 and the rotary potentiometer 13 are disposed within the first case portion 10a. The knob 13a of the rotary potentiometer 13 is arranged on a surface 10c of the first case portion 10a. In an example, the knob 13a of the rotary potentiometer 13 can be rotated by 360 degree.

In an embodiment, the geomagnetic sensor 12 is disposed at a position with reference to the surface 10c. Thus, in an example, when the surface 10c of the first case portion 10a is leveled, the geomagnetic sensor 12 is positioned horizontally in the first case portion 10a.

In an embodiment, the power supply circuit 17 is disposed in the second case portion 10b and coupled to the plug 17a. In an example, the plug 17a can be arranged in different forms with respect to the second case portion 10b. FIG. 3A shows a first form in which the plug 17a protrudes from a bottom side of the second case portion 10b. FIG. 3B shows a second form in which the plug 17a protrudes from a bottom position of a face side of the second case portion 10b. FIG. 3C shows a third form in which the plug 17a protrudes from a side position of the face side of the second case portion 10b.

In an example, the radio transmitting device 10 is made that the plug 17a can be adjusted by 90° to switch between the first form and the second form as shown to FIG. 3B. Further, the second case portion 10b can rotate with reference to the first case portion 10c to change position of the plug 17a.

According to an aspect of the disclosure, electrical power sockets may be differently positioned. No matter how an electrical power socket is positioned, the plug 17a can be arranged to install the radio transmitting device 10 with the first surface 10c of the first case portion 10a being horizontally positioned.

Figure 4A:
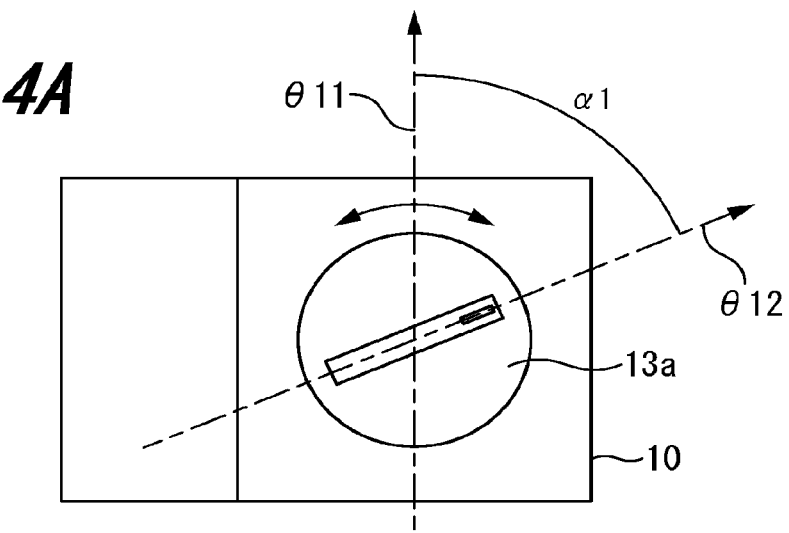
FIG. 4A, FIG. 4B, and FIG. 4C are the figures explaining an example how the radio transmitting device 10 outputs correction data according to an embodiment of the disclosure.
Figure 4B:
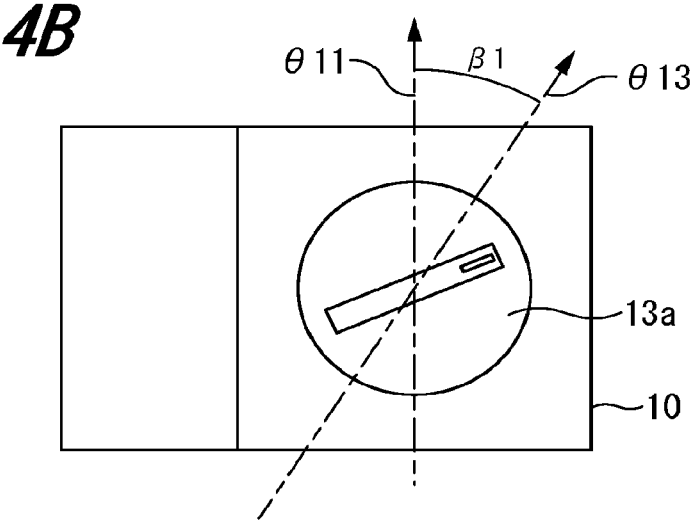
Figure 4C:
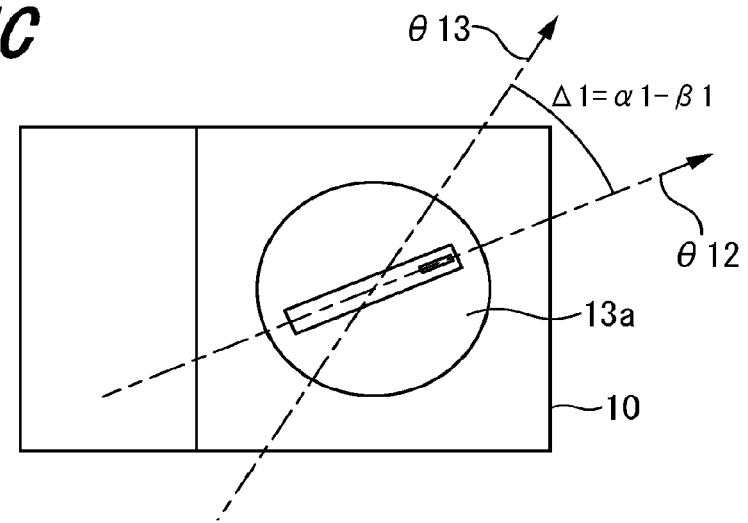

FIG. 4A, FIG. 4B, and FIG. 4C are the figures explaining an example how the radio transmitting device 10 outputs correction data according to an embodiment of the disclosure.

It is noted that in an embodiment, the radio transmitting device 10 is installed with the surface 10c being arranged horizontally. The knob 13a is on the surface 10c. The geomagnetic sensor 12 in the radio transmitting device 10 is also horizontally positioned when the surface 10c is arranged horizontally.

As shown in FIG. 4A, when an operator installs the radio transmitting device 10, the operator turns the knob 13a to a specific direction, such as north. The north direction is confirmed using for example, a map, and the like. In FIG. 4A, the operator adjusts the knob 13a with azimuth θ12 being north. The rotary potentiometer 13 then has a resistance value corresponding to angle α1 from reference-axis angle θ11 to azimuth θ12 of the radio transmitting device 10. Then, the rotary potentiometer 13 outputs a voltage having a voltage value as a function of the angle α1.

FIG. 4B shows an azimuth θ13 (north) detected by the geomagnetic sensor 12, and an angle β1 from the reference-axis angle θ11 of the radio transmitting device 10 to the azimuth θ13. When there is no error in the azimuth detected by the geomagnetic sensor 12, the angle β1 of FIG. 4B corresponds (equals) to the angle α1 of FIG. 4A.

The angle β1 may not equal to the angle α1 due to influence of surrounding environment. In an example, the angle β1 is likely not equal to the angle α1 indoors.

FIG. 4C shows a correction angle Δ1 when the angle α1 and angle β1 can be determined. In the FIG. 4C example, the correction angle Δ1 is calculated according to following formula:

$$\Delta 1 = \alpha 1 - \beta 1$$

In an example, the memory 14 stores the correction angle Δ1 as the correction data. The controller 11 of the radio transmitting device 10 can read the correction angle Δ1 from the memory 14. Then the controller 11 lets the beacon signal to carry the correction angle Δ1, and the beacon signal is transmitted by the wireless communication processing circuit 15.

Figure 5:
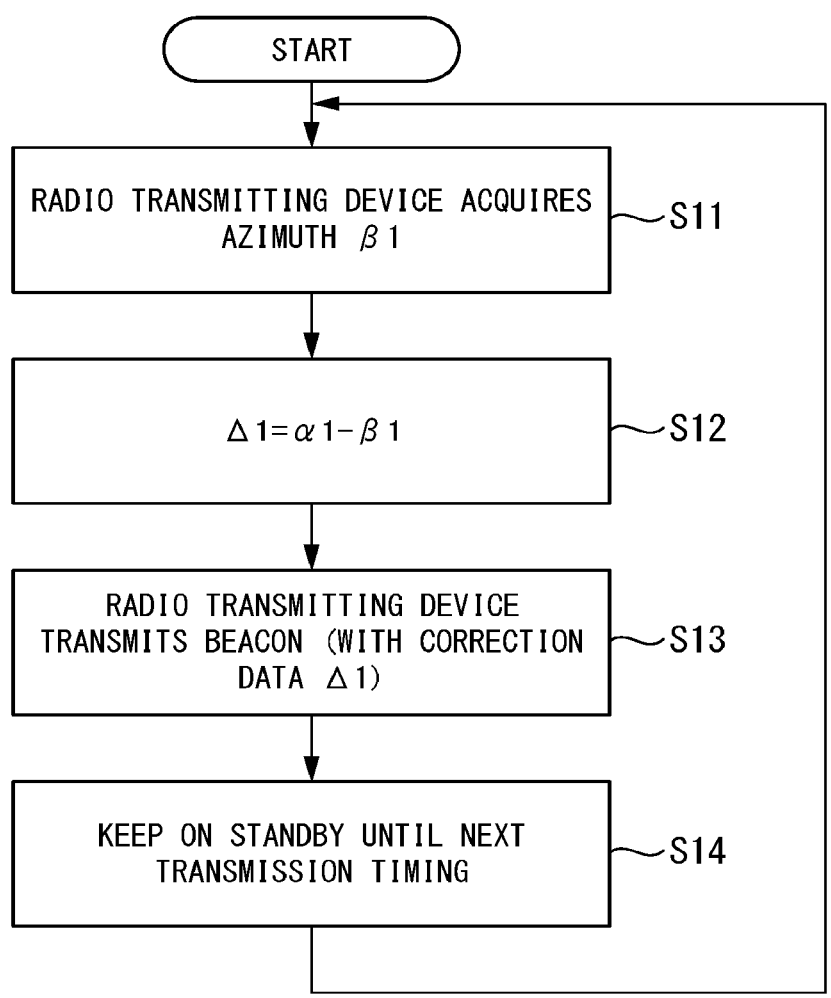
FIG. 5 shows a flowchart outlining a process executed by the controller 11 of the radio transmitting device 10.

FIG. 5 shows a flowchart outlining a process executed by the controller 11 of the radio transmitting device 10. In an example, at a time when the radio transmitting device 10 is installed, the operator sets the azimuth θ12, and the angle α1 from the reference-axis angle θ11 to the azimuth θ12 is determined and set in the controller 11.

At step S11: the controller 11 receives the azimuth θ13 of the reference north detected by the geomagnetic sensor 12, and calculates the angle β1 from the reference-axis angle θ11 of the radio transmitting device 10 to the azimuth θ13.

At step S12: the controller 11 calculates correction angle Δ1. In an example, the controller 11 calculates the correction angle Δ1 as a difference between the angle α1 and the angle β1. Then the controller 11 stores the correction angle Δ1 as the correction data in the memory 14.

At step S13: the controller 11 reads the correction data from the memory 14, and lets the beacon signal to carry the correction data. Then, the wireless communication processing circuit 15 radio-transmits the beacon signal that carries the correction data.

At step S14: the controller 11 waits until a next time to transmit a beacon signal. In an example, the controller 11 keeps standby a fixed period corresponding to the transmission interval of a beacon signal. At a next time to transmit the beacon signal, the process returns to the step S11.

Figure 6:
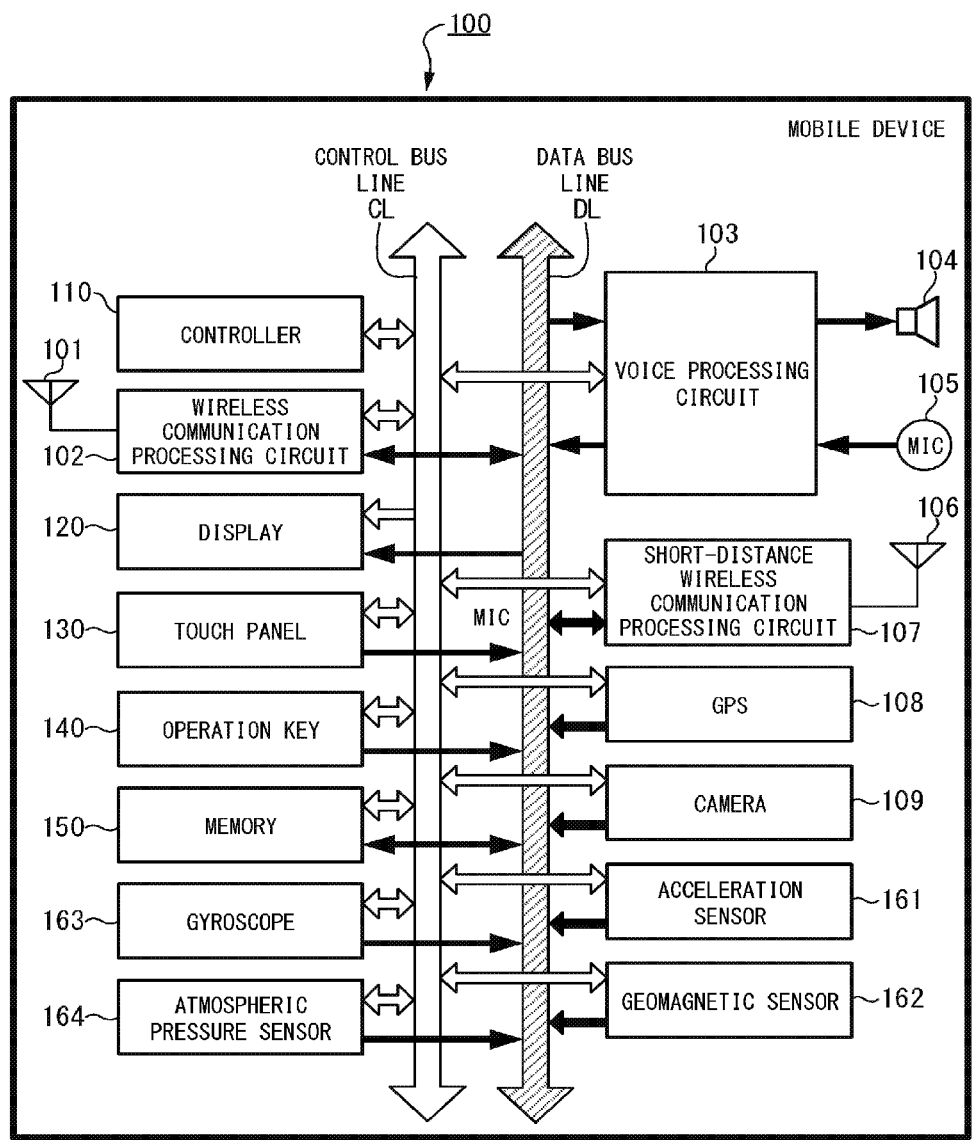
FIG. 6 shows a block diagram of the mobile device 100 according to an embodiment of the disclosure.

FIG. 6 shows a block diagram of the mobile device 100 according to an embodiment of the disclosure. In an example, the mobile device 100 is a smart phone, a tablet computer, a laptop computer, a wearable electronic device, a cellular phone, a music player, a camera, and the like. The mobile device 100 has an antenna 101 and a wireless communication processing circuit 102. In an example, the wireless communication processing circuits 102 performs the base band and radio frequency signal processing.

The voice processing circuit 103 processes electrical signals corresponding to voice. The speaker 104 generates sound waves in response to electrical signals. The microphone 105 generates electrical signals in response to sound waves.

In an example, the voice processing circuit 103 provides electrical signals in response to voice to the wireless communication processing circuit 102. The wireless communication processing circuit 102 performs communication signal processing. The processed signal can be transmitted by the antenna 101.

In the FIG. 6 example, the electronic device 100 includes an antenna 106 coupled to a short-distance wireless communication processing circuit 107. In an example, the short-distance wireless communication processing circuit 107 performs wireless communications according to a Bluetooth (trademark) standard, such as Bluetooth Low Energy (BLE) standard. In an example, the short-distance wireless communication process circuit 107 receives the beacon signal transmitted from the radio transmitting device 10.

In addition, in an example, the short-distance wireless communication process circuit 107 is configured to perform wireless communications, for example, according to a wireless local area network (WLAN) standard.

The GPS 108 receives the electromagnetic wave from one or more satellites, and measures present position based on the received electromagnetic wave.

The camera 109 generates electrical signals corresponding to images. The display 120 includes a display panel. In an example, the display panel is a liquid crystal display panel or an organic electroluminescence display panel. Characters and images can be shown on the display panel.

The touch panel 130 includes touch sensors which detect a touch, such as a figure touch, a pen touch, and the like on the surface of the display panel. In an embodiment, electrostatic capacitance type touch sensors are used. In an example, the touch panel 130 is integrated with the display 120.

The controller 110 controls various parts of the mobile device 100 based on for example the data detected by the touchscreen part 130 or the operation key 140.

In an example, the display 120 shows a keyboard etc., the controller 110 controls a displaying condition.

The memory 150 stores data and software instructions. In an embodiment, the controller 110 is implemented as a processing circuitry executing software instructions. In another embodiment, the controller 110 is implemented as circuits.

The acceleration sensor 161 detects an acceleration of the mobile device 100. The detection data of acceleration by the acceleration sensor 161 can be provided to the controller 110.

The geomagnetic sensor 162 detects an azimuth from a terrestrial magnetism. The detection data of the azimuth can be provided to the controller 110.

The gyroscope 163 detects the angular velocity of the mobile device 100. The detection data of the angular velocity can be supplied to the controller 110.

The atmospheric-pressure sensor 164 detects the atmospheric pressure around the mobile device 100. The detection data of the atmospheric pressure can be supplied to the controller 110.

In the FIG. 6 example, the mobile device 100 includes communication bus lines, such as a control bus line CL, a data bus line DL, and the like that couple the various components together. The control data from the controller 110 can be transmitted through the control bus line CL. The data line bus DL is used for transmission of voice data, display data, etc.

Figure 7:
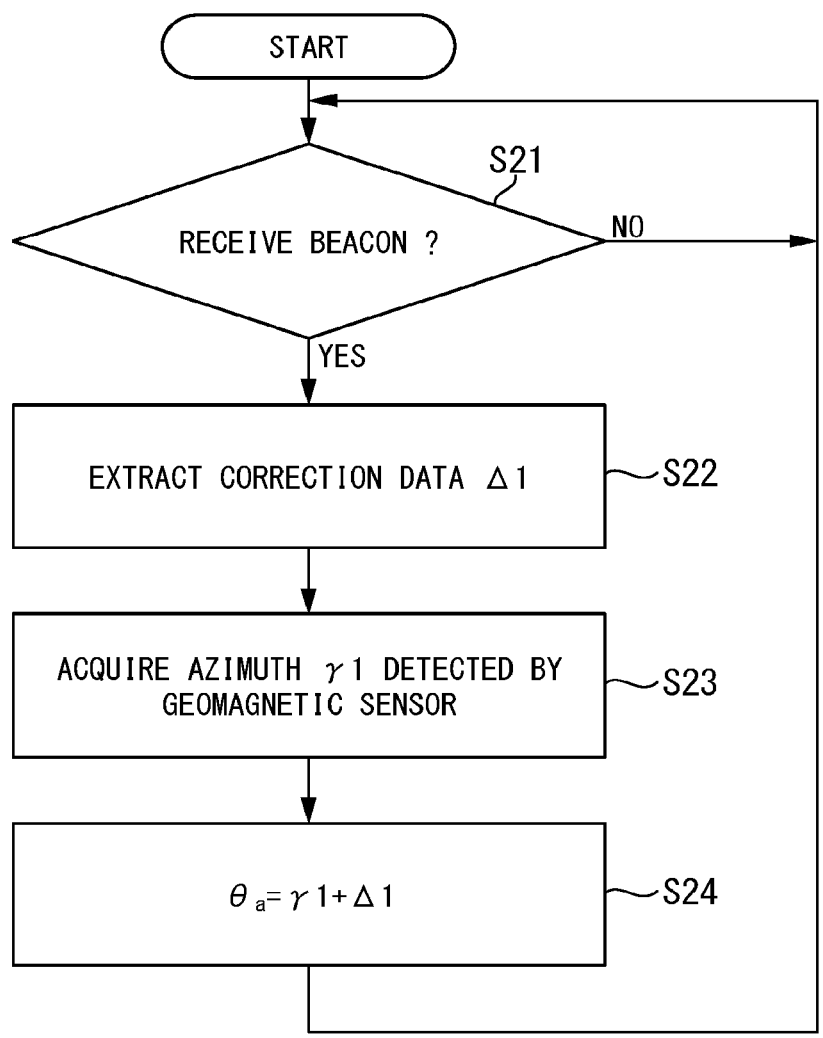
FIG. 7 shows a flowchart outlining an example of a correction process according to an embodiment of the disclosure.

FIG. 7 shows a flowchart outlining an example of a terrestrial magnetism correction process according to an embodiment of the disclosure. In an example, the process is executed by the controller 110.

At step S21: the controller 110 determines whether the short-distance wireless communication process circuit 107 receives a beacon signal from the radio transmitting device 10. When a beacon signal with correction data is received from the radio transmitting device 10, the process proceeds to S22; otherwise, the process stays at step S21 until a beacon signal is received.

In an example, when a received beacon signal does not carry the correction data for a geomagnetic sensor, the process stays at step S21 until a beacon signal with the correction data is received.

At step S22: the controller 110 extracts the correction data carried in the received beacon signal, and obtains correction angle $\Delta 1$ from the extracted correction data.

At step S23: the controller 110 acquires azimuth $\gamma 1$ detected by the geomagnetic sensor 162 in the mobile device 100.

At step S24: the controller 110 calculates corrected azimuth $\theta a$ as a sum of the correction angle $\Delta 1$ and the azimuth $\gamma 1$ detected by the geomagnetic sensor 162. Then, the controller 110 uses the corrected azimuth $\theta a$ to perform a position detection. In an example, the process then return to S21 to wait for a beacon signal.

Figure 8:
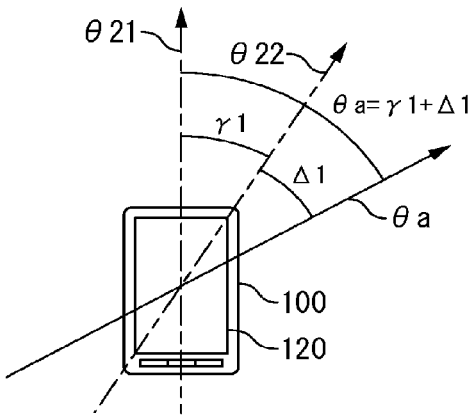
FIG. 8 shows an example of the azimuth correction process according to an embodiment of the disclosure.

FIG. 8 shows an example of the azimuth correction process according to an embodiment of the disclosure. In the example, the controller 110 in the mobile device 100 performs the process to correct the detection data of the geomagnetic sensor 162. The geomagnetic sensor 162 is disposed in the mobile device 100 to detect the azimuth $\theta 22$ which is the azimuth north to be used as a reference. At a time, the controller 110 calculates an angle $\gamma 1$ from azimuth $\theta 22$ to a reference-axis $\theta 21$ of the mobile device 100. Then, the controller 110 adds the correction angle $\Delta 1$ to angle $\gamma 1$ to obtain the corrected azimuth $\theta a$.

The mobile device 100 uses the correction data transmitted from the radio transmitting device 10 to correct the azimuth detected by the geomagnetic sensor 162 in the mobile device 100.

According to an aspect of the disclosure, the azimuth detection error is location dependent. At different locations, the geomagnetic sensor 162 in the mobile device 100 may have different azimuth detection error. In an example, the geomagnetic sensor 162 may have a relatively large azimuth detection error when the mobile device 100 is indoors.

In an embodiment, the radio transmitting device 10 is installed at a location, the rotary potentiometer 13 is set to indicate azimuth north that is used as the reference, and the geomagnetic sensor 12 is used to determine the location dependent error and to generate correction data for the location.

In an example, when the mobile device 100 is in a close vicinity of the radio transmitting device 10 to be able to receive the beacon signal from the radio transmitting device 10, the geomagnetic sensor 162 generates similar location dependent error as the geomagnetic sensor 12. Using the correction data determined based on the geomagnetic sensor 12, the azimuth detected by the geomagnetic sensor 162 detected can be corrected. With the location dependent error being corrected in the detected azimuth by the geomagnetic sensor 162, the mobile device 100 can perform more accurate position detection using autonomous navigation.

Figure 9:
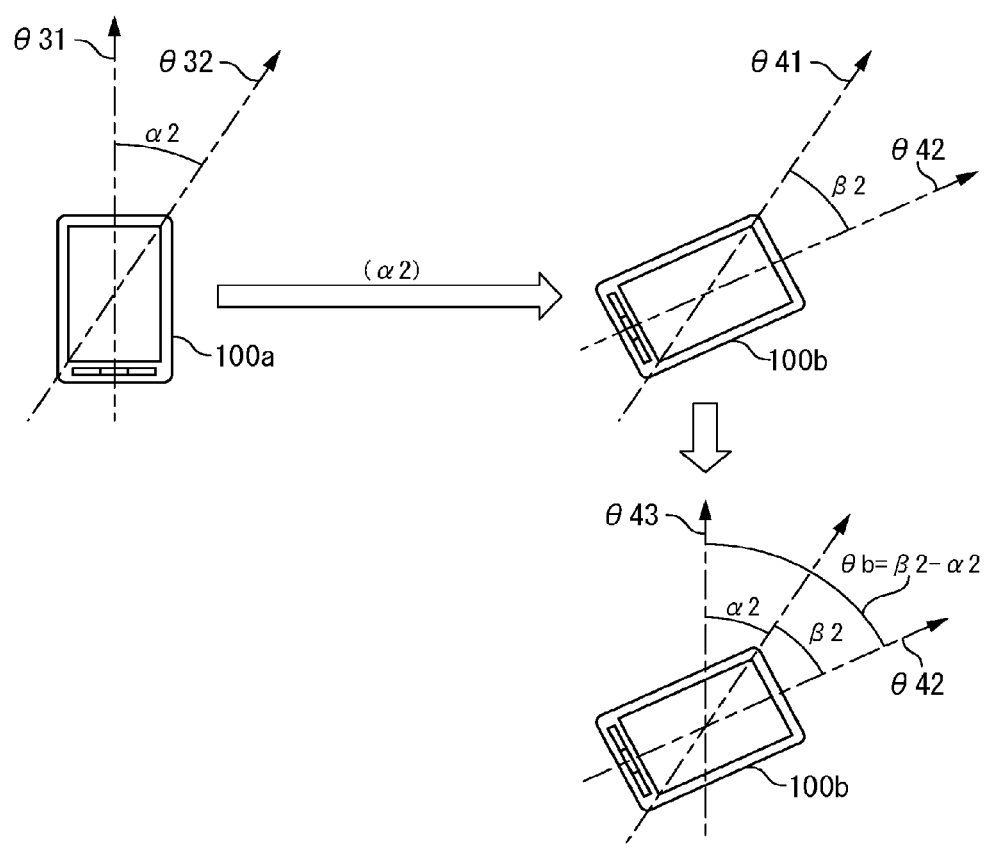
FIG. 9 is a diagram of another example of azimuth detection according to an embodiment of the disclosure.

FIG. 9 is a diagram of another example of azimuth detection according to an embodiment of the disclosure. In the FIG. 9 example, two mobile devices 100a and 100b can communicate and perform azimuth detection and correction. Each of the mobile devices 100a and 100b can be configured similarly as the example shown in FIG. 6, and each of the mobile devices 100a and 100b has a respective geomagnetic sensor.

Further, each of the mobile devices 100a, 100b includes a short-distance wireless communication process circuit 107 that performs wireless communications according to, for example, a Bluetooth standard or wireless LAN standard.

In the FIG. 9 example, between the two devices, the mobile device 100a is a master device and the mobile device 100b is a slave device. The master mobile device 100a and slave mobile device 100b enter a state in which both devices can transfer data mutually.

In an embodiment, the master mobile device 100a detects an angle between a reference axis and an azimuth north detected by the geomagnetic sensor in the master mobile device 100a.

For example, as shown in FIG. 9, the master mobile device 100a has a reference axis θ31 that is a center case line passing through the upper and lower sides on the case of the master mobile device 100. The geomagnetic sensor in the master mobile device 100a detects north azimuth θ32, and calculates angle α2 between the reference axis θ31 and north azimuth θ32. The master mobile device 100a transmits the angle α2 as the correction data to the slave mobile device 100b. The master mobile device 100a can transmit the correction data to the slave mobile device 100b at any time.

The slave mobile device 100b detects a reference axis θ42 which is the case center line passing through the upper and lower sides on the case of the slave mobile device 100b. Further, the salve mobile device 100b detects the azimuth north θ41 using the geomagnetic sensor in the slave mobile device 100b. Then the slave mobile device 100b calculates angle β2 which is the difference between the reference axis θ42, and north azimuth θ41.

Based on the correction data, the slave mobile device 100b calculates an angle θb with reference to the reference-axis θ31 of master mobile device 100a. In the FIG. 9 example, the slave mobile device 100b calculates angle θb using the equation: θb=β2−α2. The angle θb is the angle between the reference axis of the slave mobile device 100b to the reference axis of the master mobile device 100a. Further, based on the angle θb, and the reference axis of itself, the slave mobile device 100b can determine an axis θ43 which is about the same as the reference-axis θ31 of master mobile device 100a.

In an embodiment, the two mobile devices 100a and 100b can detect positions based on a same reference axis, such as the reference axis of the master mobile device 100a. Thus, the two mobile devices 100a and 100b can align position detection, and achieve about the same precision to perform autonomous navigation.

In the FIG. 9 example, the mobile devices 100a, 100b transmit correction data by Bluetooth standard or wireless LAN standard. In another example, the correction data can be transmitted via a server. For example, the server stores and transmits the position data measured by each of the mobile devices 100a, 100b.

Figure 10A:
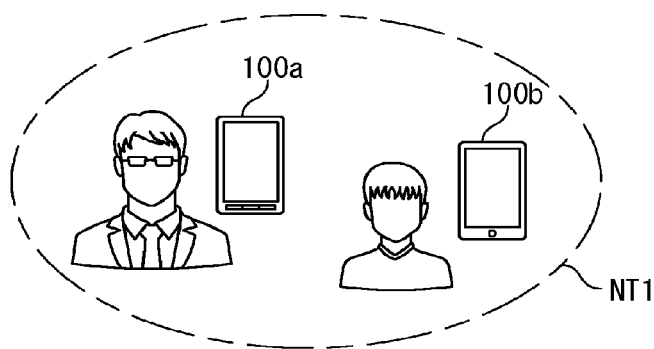
FIGS. 10A and 10B show an example in which the mobile devices 100a, 100b respectively perform an autonomous navigation independently.
Figure 10B:
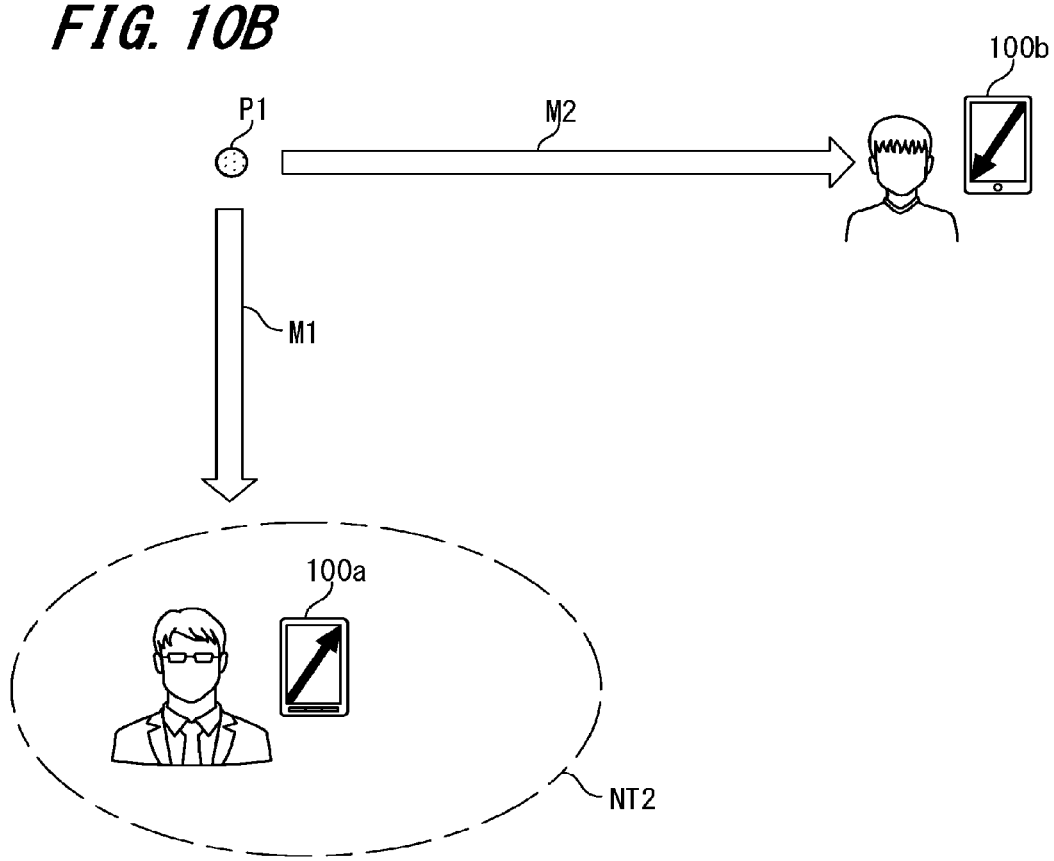

FIGS. 10A and 10B show an example in which the mobile devices 100a, 100b respectively perform an autonomous navigation independently.

As shown to FIG. 10A, initially, the slave mobile device 100b is in a range NT1 where the electromagnetic wave from master mobile device 100a can be received. Thus, the slave mobile device 100b receives the correction data transmitted from master mobile device 100a.

Based on the received correction data, the two mobile devices 100a and 100b can perform autonomous navigation with regard to a same reference axis and can align position detection.

FIG. 10B shows a situation in which the mobile devices 100a, 100b move away from the initial position P1. In the FIG. 10B example, the master mobile device 100a moves away as indicated by M1 to a new position. With the movement, the communication area of the master mobile device 100a changes to a range NT2 centering at the new position.

The slave mobile device 100b moves away as indicated by M2 to a new position. The new position of the slave mobile device 100b is out of the range NT2.

At the new positions, each of the mobile devices 100a and 100b detects respective present position using autonomous navigation. In an embodiment, the mobile devices 100a and 100b can use a same reference axis determined initially when they are in close vicinity, to detect the new positions, thus the new positions can be detected at about the same precision.

Further, in the FIG. 10B example, the slave mobile device 100b can notify its new position to the master mobile device 100a via a server. When the master mobile device 100a receives the notification, the master mobile device 100a can show the present position of the slave mobile device 100b on a display.

Similarly, the master mobile device 100a can notify its new position to the slave mobile device 100a via a server. When the slave mobile device 100b receives the notification, the slave mobile device 100b can show on a display the present position of the master mobile device 100a.

FIG. 11 shows a flowchart outlining a process example executed by the controller 110 of the master mobile device 100a.

At step S31: the controller 110 establishes wireless communication with the slave mobile device 100b using, for example, the short-distance wireless communication process circuit 107.

At step S32: the controller 110 determines an angle α2 which is the angle from the reference-axis θ31 of the master mobile device 100a to the azimuth north θ32 detected by a geomagnetic sensor 162 in the master mobile device 100a.

At step S33: the short-distance wireless communication process circuit 107 transmits the correction data, such as the angle α2, to the slave mobile device 100b.

At step S34: the controller 110 uses the detection data by the acceleration sensor 161, the gyroscope 163 and the geomagnetic sensor 162, and starts the autonomous navigation to measure present position. For example, the acceleration sensor 161 detects an acceleration of the mobile device 100. The geomagnetic sensor 162 detects an azimuth from a terrestrial magnetism. The azimuth is used as a reference. The gyroscope 163 detects the angular velocity of the mobile device 100 that indicative of the direction change. Based on the azimuth and the angular velocity, the direction can be determined. Based on the acceleration and the direction, travel distance can be determined and the present location can be determined. In an example, the autonomous navigation can use a pedestrian dead-reckoning (PDR) method to determine the present position.

At step S35: the controller 110 waits for a period of time, such as a fixed period of time.

At step S36: the controller 110 determines whether the short-distance wireless communication process circuit 107 can communicate to the slave mobile device 100b. In an example, when the short-distance wireless communication process circuit 107 is able to receive a signal from the slave mobile device 100b, the controller 110 determines that the short-distance wireless communication process circuit 107 is able to communicate to the slave mobile device 100b, and the process returns to step S32.

When the short-distance wireless communication process circuit 107 receives no signal from the slave mobile device 100b, the controller 110 determines that the slave mobile device 100b may be out of a reachable range, then the process proceeds to step S37.

At step S37: the controller 110 receives position data of slave mobile device 100b from a server using wireless communications. It is noted that position data can be received by the short-distance wireless communication process circuit 107 or by the wireless communication processing section 102. Then the process returns to S36.

Figure 12:
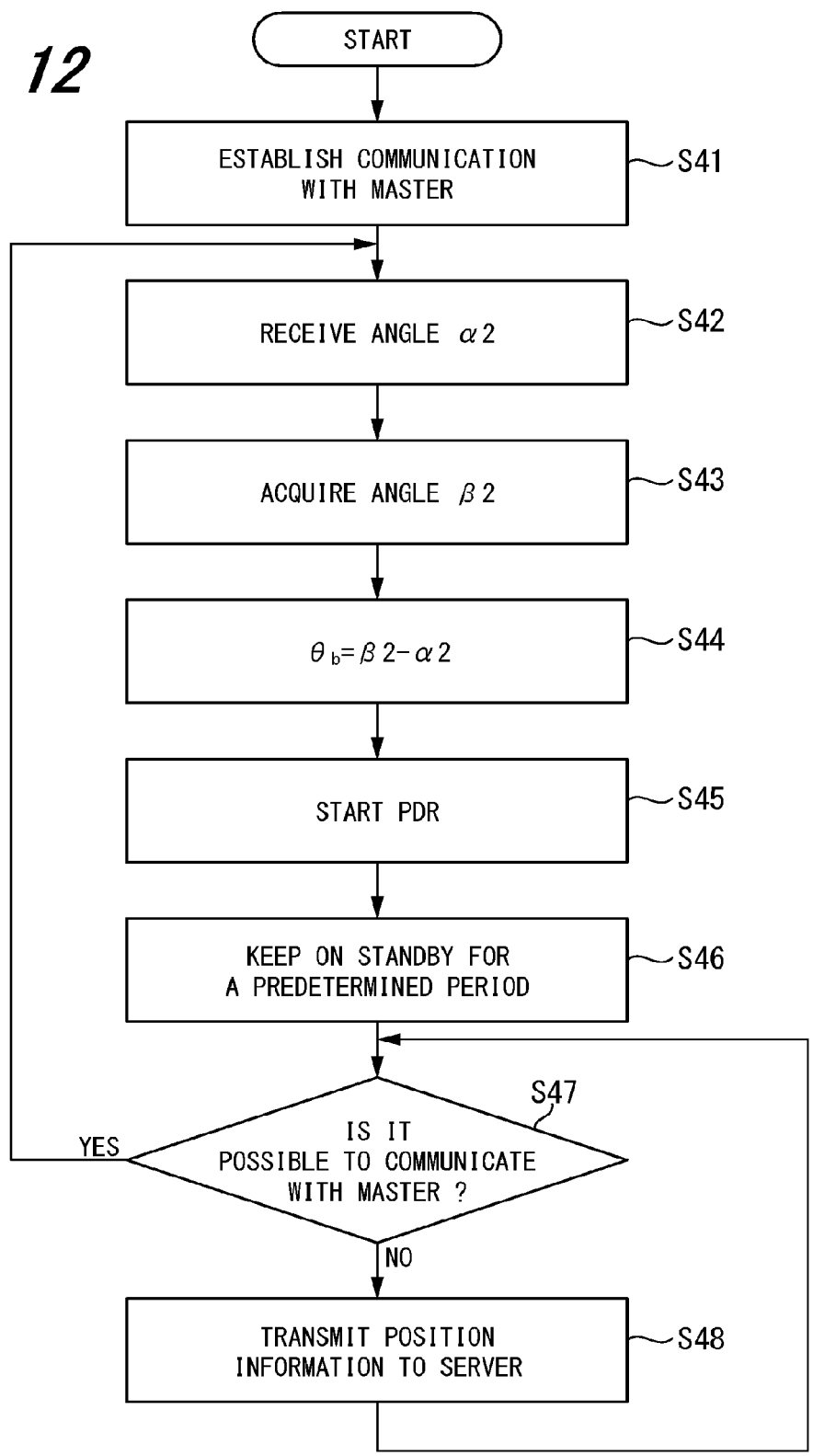
FIG. 12 shows a flowchart outlining a process example executed by the controller 110 in the slave mobile device 100b.

FIG. 12 shows a flowchart outlining a process example executed by the controller 110 in the slave mobile device 100b.

At step S41: the controller 110 establishes wireless communication with the master mobile device 100a using the short-distance wireless communication process circuit 107.

At step S42: the controller 110 receives correction data, such as the angle α2, from signals transmitted from the master mobile device 100a.

At step S43: the controller 110 calculates the angle β2. The angle β2 is calculated as an angle from the reference-axis θ42 of the mobile device 100b to the azimuth north θ41 detected by the geomagnetic sensor 162 in the slave mobile device 100b. In an embodiment, when the master mobile device 100a and the slave mobile device 100b are in a close vicinity to be able to communicate using a short-distance wireless communication standard, the master mobile device 100a and the slave mobile device 100b have about the same surrounding environment. Thus, the geomagnetic sensors 162 in the master mobile device 100a and the slave mobile device 100b detect about the same azimuth north. Thus, the azimuth north θ32 is about the same as the azimuth north θ41.

At step S44: the controller 110 calculates the angle θb. The angle θb is the difference between β2 and α2.

At step S45: the controller 110 uses the detection data of the acceleration sensor 161, the gyroscope 163 and the geomagnetic sensor 162, and starts the autonomous navigation to measure present position. In an example, the autonomous navigation can use a pedestrian dead-reckoning (PDR) method to determine the present position.

At step S46: the controller 110 waits for a period of time, such as a fixed period of time.

At step S47: the controller 110 determines whether the short-distance wireless communication process circuit 107 can communicate to the master mobile device 100a. In an example, when the short-distance wireless communication process circuit 107 is able to receive a signal from the master mobile device 100a, the controller 110 determines that the short-distance wireless communication process circuit 107 is able to communicate to the master mobile device 100a, and the process returns to step S42.

When the short-distance wireless communication process circuit 107 receives no signal from the master mobile device 100a, in an example, the controller 110 determines that the master mobile device 100a is not in a close vicinity, then the process proceeds to step S48.

At step S48: the controller 110 controls the short-distance wireless communication process circuit 107 or the wireless communication processing section 102 to transmit the positional information of the slave mobile device 100b to a server, and the process returns to step S47.

According to an aspect of the disclosure, using the processes shown in FIG. 11 and FIG. 12, the mobile devices 100a and 100b can use about the same reference-axis. Thus, the mobile devices 100a and 100b can achieve substantially the same precision to detect position using autonomous navigation. Moreover, the master mobile device 100a can determine the correct position of the slave mobile device 100b.

In the example of FIG. 1, the radio transmitting device 10 can transmit a beacon signal using a wireless communication system, such as BLE system, wireless LAN and the like. The beacon signal carries correction data.

In the example of FIG. 9, the master mobile device 100a can transmit signals that carry correction data to the slave mobile device 100b using a wireless communication system, such as BLE system, a wireless LAN and the like.

It is noted that any suitable apparatus which has a wireless communication function can transmit the correction data of a geomagnetic sensor to a surrounding mobile device to assist position detection. For example, access points for a wireless LAN can transmit the correction data of a geomagnetic sensor to a surrounding mobile device.

In an embodiment, the controller 11 or controller 110 is implemented as circuits. In another embodiment, the functions of the controller 11 or the controller 110 are implemented as software to be executed by a processing circuit. The software can be installed in an existing wireless communication apparatus with a geomagnetic sensor. In an example, the software can be executed in the existing wireless communication apparatus to generate correction data for azimuth detection and to transmit the correction data. In another example, the software can be executed in the existing wireless communication apparatus to receive correction data and correct azimuth detection based on the correction data.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A radio transmitting device comprising:
    a memory configured to store correction data for correcting an azimuth angle detected by a device in a surrounding range around a location where the radio transmitting device is installed;
    a controller configured to calculate the correction data based on a reference angle;
    a wireless communication processing circuit configured to transmit a radio signal to carry the correction data to assist the device in the surrounding range to correct the azimuth angle; and
    a potentiometer communicatively coupled with a knob, the potentiometer configured to be positioned horizontally to the ground and the knob configured to be manually turned by a user at installation to align with one of geographic cardinal directions for indicating the reference angle, wherein the knob stays as aligned with the one of geographic cardinal directions until the user manually turns the knob again.

2. The radio transmitting device of claim 1, wherein the memory is configured to store an error correction angle for correcting the azimuth angle.

3. The radio transmitting device of claim 1, wherein the wireless communication processing circuit is configured to transmit the radio signal as a beacon signal that is transmitted periodically to carry the correction data.

4. The radio transmitting device of claim 1, wherein the wireless communication processing circuit is configured to transmit the radio signal according to a short distance wireless communication standard.

5. The radio transmitting device of claim 1, further comprising:
a geomagnetic sensor configured to measure the azimuth angle at the location.

6. The radio transmitting device of claim 5, further comprising:
a reference angle device configured to generate an electrical signal in response to the reference angle;
wherein the controller is configured to calculate the correction data based on the reference angle and the azimuth angle detected by the geomagnetic sensor.

7. The radio transmitting device of claim 6, wherein reference angle device includes the potentiometer for indicating the reference angle.

8. The radio transmitting device of claim 7, further comprising:
a plug for connection to an AC power source; and
a rotary mechanism configured to adjust a relative angle between the plug and the potentiometer.

9. A mobile device comprising:
a geomagnetic sensor configured to detect an azimuth angle;
a wireless communication processing circuit configured to receive a radio signal carrying correction data for correcting the azimuth angle, the correction data calculated based on a reference angle indicated by a potentiometer communicatively coupled with a knob, the potentiometer configured to be positioned horizontally to the ground and the knob configured to be manually turned by a user at installation to align with one of geographic cardinal directions for indicating the reference angle, wherein the knob stays as aligned with the one of geographic cardinal directions until the user manually turns the knob again; and
a controller configured to correct the azimuth angle detected by the geomagnetic sensor based on the correction data carried in the radio signal.

10. The mobile device of claim 9, wherein
the wireless communication processing circuit is configured to receive a beacon signal carrying the correction data; and
the controller is configured to exact the correction data from the beacon signal.

11. The mobile device of claim 9, wherein the radio signal carrying the correction data for correcting the azimuth angle was transmitted from another mobile device.

12. The mobile device of claim 11, wherein the controller is configured to calculate an alignment angle based on the correction data and the azimuth angle to align a reference used by the mobile device and the other mobile device for position detection.

13. The mobile device of claim 9, wherein the wireless communication processing circuit is configured to receive the radio signal carrying correction data for correcting the azimuth angle according to a short distance wireless communication standard.

14. A method for detecting azimuth angle comprising:
indicating a reference angle by a potentiometer communicatively coupled with a knob, the potentiometer configured to be positioned horizontally to the ground and the knob configured to be manually turned by a user at installation to align with one of geographic cardinal directions for indicating the reference angle, wherein the knob stays as aligned with the one of geographic cardinal directions until the user manually turns the knob again;
calculating correction data based on the reference angle;
receiving, by a wireless communication processing circuit in a mobile device, a radio signal carrying the correction data for azimuth angle correction;
detecting, by a geomagnetic sensor, an azimuth angle; and
correcting the azimuth angle based on the correction data carried in the radio signal.

15. The method of claim 14, wherein receiving, by the wireless communication processing circuit in the mobile device, the radio signal carrying the correction data for azimuth angle correction further comprises:
receiving a beacon signal carrying the correction data.

16. The method of claim 15, further comprising:
processing the beacon signal to extract the correction data.

17. The method of claim 14, wherein receiving, by the wireless communication processing circuit in the mobile device, the radio signal carrying the correction data for azimuth angle correction further comprises:
receiving the radio signal which is transmitted from a radio transmitting device which is installed at a location to transmit the correction data associated with the location.

18. The method of claim 14, wherein receiving, by the wireless communication processing circuit of the mobile device, the radio signal carrying the correction data for azimuth angle correction further comprises:
receiving the radio signal which is transmitted from another mobile device.

19. The method of claim 18, further comprising:
calculating an alignment angle based on the correction data and the azimuth angle; and
aligning a reference used by the mobile device and the other mobile device for position detection.

20. The method of claim 14, wherein receiving, by the wireless communication processing circuit in the mobile device, the radio signal carrying the correction data for azimuth angle correction further comprises:
receiving the radio signal carrying correction data for correcting the azimuth angle according to a short distance wireless communication standard.

* * * * *